(12) United States Patent
Hayes et al.

(10) Patent No.: US 12,391,374 B2
(45) Date of Patent: Aug. 19, 2025

(54) AIRCRAFT HYDRAULIC BRAKING SYSTEM INCLUDING HYDRAULIC ACCUMULATOR AND A BRAKE ACTUATOR

(71) Applicant: Airbus Operations Limited, Bristol (GB)

(72) Inventors: Alexander Hayes, Bristol (GB); Yasser Ibrahim, Bristol (GB); Marica Palitta, Bristol (GB); Romain Siegel, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 177 days.

(21) Appl. No.: 17/956,697

(22) Filed: Sep. 29, 2022

(65) Prior Publication Data

US 2023/0101767 A1 Mar. 30, 2023

(30) Foreign Application Priority Data

Sep. 30, 2021 (GB) ...................................... 2114023

(51) Int. Cl.
 *B64C 25/42* (2006.01)
(52) U.S. Cl.
 CPC .................................. *B64C 25/42* (2013.01)
(58) Field of Classification Search
 CPC .................................................... B64C 25/42
 See application file for complete search history.

(56) References Cited

U.S. PATENT DOCUMENTS

| | | | |
|---|---|---|---|
| 2,502,152 A * | 3/1950 | Hudson | B60T 13/141 188/106 R |
| 3,948,569 A | 4/1976 | Gentet et al. | |
| 4,121,874 A | 10/1978 | Knox et al. | |
| 4,251,115 A * | 2/1981 | Knox | B60T 8/445 303/113.1 |
| 4,264,109 A * | 4/1981 | Knox | B64C 25/42 303/68 |
| 4,792,192 A | 12/1988 | Tveitane | |
| 5,397,173 A | 3/1995 | Bourguet | |
| 5,411,323 A | 5/1995 | Takahashi et al. | |
| 5,456,523 A | 10/1995 | Boehringer | |
| 8,038,094 B2 | 10/2011 | Oyama | |
| 2002/0057012 A1 | 5/2002 | Bourguet et al. | |
| 2009/0242694 A1 | 10/2009 | Oyama | |

(Continued)

FOREIGN PATENT DOCUMENTS

| | | |
|---|---|---|
| CN | 108284947 | 7/2018 |
| DE | 1072103 | 12/1959 |

(Continued)

OTHER PUBLICATIONS

Extended European Search Report in EP 22 19 9137 (May 23, 2023)(13 pages).

(Continued)

*Primary Examiner* — Arfan Y. Sinaki
(74) *Attorney, Agent, or Firm* — Nixon & Vanderhye P.C.

(57) ABSTRACT

An aircraft hydraulic braking system having at least one hydraulic accumulator and a brake actuator. The at least one hydraulic accumulator is the sole source of pressurised hydraulic fluid in the aircraft hydraulic braking system for operating the brake actuator and thereby apply a braking force to a wheel on an aircraft.

12 Claims, 2 Drawing Sheets

(56) References Cited

U.S. PATENT DOCUMENTS

| | | | | |
|---|---|---|---|---|
| 2014/0014447 A1* | 1/2014 | O'Connell | ............. | B64C 25/44 |
| | | | | 74/483 PB |
| 2014/0117151 A1 | 5/2014 | Fox et al. | | |
| 2016/0016575 A1* | 1/2016 | Howell | ................ | B60T 13/662 |
| | | | | 701/3 |
| 2019/0106095 A1* | 4/2019 | Burte | ...................... | B60T 13/66 |
| 2020/0391856 A1* | 12/2020 | Knudsen | ................ | B64D 27/02 |

FOREIGN PATENT DOCUMENTS

| | | |
|---|---|---|
| EP | 3466780 | 4/2019 |
| GB | 598383 | 2/1948 |
| GB | 1166481 | 10/1969 |
| GB | 2563675 | 12/2018 |
| GB | 2602157 | 6/2022 |

OTHER PUBLICATIONS

EP Search Report in EP 23 15 4209 (Jun. 13, 2023)(6 pagtes).
European Search Report cited in EP 22199137.5 mailed Jan. 25, 2023, 20 pages.

* cited by examiner

AIRCRAFT HYDRAULIC BRAKING SYSTEM INCLUDING HYDRAULIC ACCUMULATOR AND A BRAKE ACTUATOR

RELATED APPLICATION

This application incorporates by reference in its entirety and claims priority to United Kingdom patent application GB 2114023-1, filed Sep. 30, 2021.

TECHNICAL FIELD

The present invention relates to braking systems for aircraft, particularly aircraft hydraulic braking systems, methods of and controllers for controlling the same, and aircraft comprising the braking systems and/or hydraulic braking systems.

Aircraft braking systems typically comprise one or more primary energy sources, such as pumps, for operating plural brakes of an aircraft, such as to slow the aircraft during a landing event on a runway.

BACKGROUND

Some aircraft braking systems also comprise backup, or alternative, sources of pressurised hydraulic fluid for operating the brakes, such as hydraulic accumulators. These may be used to operate the brakes in the event of a failure of the one or more primary energy sources.

The present invention aims to provide improved aircraft braking systems which are lighter, less complex and/or more efficient than known aircraft braking systems.

SUMMARY

A first aspect of the present invention provides an aircraft hydraulic braking system comprising at least one hydraulic accumulator and a brake actuator. The at least one hydraulic accumulator is the sole source of pressurised hydraulic fluid in the aircraft hydraulic braking system for operating the brake actuator.

Providing the at least one hydraulic accumulator as the sole source of hydraulic fluid for operating the brake actuator may reduce a weight and/or complexity of the aircraft hydraulic braking system, such as by reducing a number of components and/or fluid connections in the aircraft hydraulic braking system, or between the aircraft hydraulic braking system and other hydraulic systems of the aircraft. For example, the aircraft hydraulic braking system need not be fluidically connected or connectable to a centralised hydraulic system of the aircraft. Indeed, such a centralised hydraulic system could be omitted from the aircraft.

Optionally, the aircraft hydraulic braking system is free from plural hydraulic accumulators fluidically connected in series. This may similarly reduce a weight and/or complexity of the aircraft hydraulic braking system, such as by reducing a number of components and/or fluid connections in the aircraft hydraulic braking system.

Optionally, the aircraft hydraulic braking system comprises at least one inlet for receiving hydraulic fluid to charge the at least one hydraulic accumulator, wherein the aircraft hydraulic braking system is configured so that in-flight charging of the at least one hydraulic accumulator via the at least one inlet is precluded.

This may improve an in-flight reliability of the aircraft hydraulic braking system, such as by reducing a number of components and/or fluid connections that would otherwise be required to charge the at least one hydraulic accumulator in-flight, and/or by reducing a number of operations performed in-flight, such operations including charging the at least one hydraulic accumulator. Moreover, precluding in-flight charging of the at least one hydraulic accumulator may avoid a need to certify a charging system for operation during a flight.

Optionally, the aircraft hydraulic braking system is free from any hydraulic fluid source for charging the at least one accumulator via the at least one inlet. This may reduce a number of components and/or fluid connections required to operate the hydraulic braking system, reducing a weight of the aircraft.

Specifically, such a hydraulic fluid source may be free from any pump and/or hydraulic fluid reservoir for supplying hydraulic fluid to charge the at least one hydraulic accumulator. In this way, the brake actuator may be operated using fewer, or no, moving and/or electrical power-consuming components, thereby reducing a complexity of, and improving a reliability and efficiency of, the aircraft hydraulic braking system. Moreover, omitting a pump and/or hydraulic fluid reservoir may reduce a weight of the aircraft hydraulic braking system significantly.

Optionally, the aircraft hydraulic braking system comprises a hydraulic fluid source for charging the at least one accumulator via the at least one inlet between flights. In this way, the at least one accumulator may be charged when the aircraft is on the ground, such as during taxiing or loading, without requiring connection to an external source of hydraulic fluid.

Optionally, the hydraulic fluid source comprises a hydraulic fluid reservoir and a pump for pumping hydraulic fluid from the hydraulic fluid reservoir to the at least one accumulator via the at least one inlet to charge the at least one accumulator. Optionally, the pump is precluded from pumping hydraulic fluid from the hydraulic fluid reservoir to the at least one accumulator via the at least one inlet during flight of the aircraft.

The hydraulic fluid reservoir may be configured to receive hydraulic fluid from the brake actuator during actuation of the actuator. This may be by the hydraulic braking system comprising one or more return lines and/or valves configured to return fluid from the brake actuator to the hydraulic fluid reservoir. This may allow the hydraulic fluid to be re-used following a braking event, such as to re-charge the at least one accumulator on the ground following a landing event of the aircraft during which the brake actuator is operated. This may reduce a requirement for ground crew to re-charge and/or top-up the aircraft hydraulic braking system following the braking event.

Optionally, the aircraft hydraulic braking system comprises an isolator for isolating the pump from the at least one inlet and the at least one accumulator during flight of the aircraft. Alternatively, or additionally, the aircraft hydraulic braking system is configured so that the pump is precluded from operating during flight of the aircraft.

Providing an isolator may prevent accidental in-flight charging of the at least one accumulator, and/or may ensure that no fluid is passable back to the hydraulic fluid source, such as to the pump and/or the reservoir, during operation of the brake actuator. Optionally, there is no such hydraulic fluid source in the aircraft hydraulic braking system, and the inlet, and/or isolator, is connectable to a ground-based hydraulic fluid source to charge the at least one accumulator between flights.

Precluding operation of the pump may reduce an in-flight power consumption of the aircraft hydraulic braking system, and/or may allow a smaller pump to be used, thereby reducing weight. Additionally, in this way, the hydraulic fluid system may require fewer additional components, such as additional pumps and/or valves, which may otherwise be required for improved redundancy. Moreover, precluding in-flight operation of the pump may avoid a need to certify the pump for in-flight operation.

Optionally, the pump and the reservoir are configured to provide hydraulic fluid exclusively to the aircraft hydraulic braking system. In other words, the hydraulic fluid source is a local hydraulic fluid source exclusive to the aircraft hydraulic braking system. That is, the hydraulic fluid source may be separate from, and/or isolated from, any other hydraulic fluid system of the aircraft, such as a hydraulic fluid system for operating flight surfaces of the aircraft, and/or for extending and retracting landing gear of the aircraft. That is, the brake actuator may be operated without receiving pressurised hydraulic fluid form a centralised hydraulic fluid source, or centralised hydraulic fluid system, of the aircraft. This may reduce a weight and/or complexity of the aircraft hydraulic braking system, such as by reducing a number of fluid connections between different components of the aircraft. Optionally, the hydraulic fluid source, such as the pump and/or the reservoir, is a centralised hydraulic fluid source, such as by being configured to supply hydraulic fluid to another hydraulic system of the aircraft, such as to a landing gear extension/retraction system. Alternatively, such a centralised hydraulic fluid source may be omitted from the aircraft.

Optionally, the aircraft hydraulic braking system is configured so that the at least one hydraulic accumulator is precluded from being charged during at least partial discharge of the at least one hydraulic accumulator, such as to operate the brake actuator. Optionally, the pump is precluded from pumping hydraulic fluid from the hydraulic fluid reservoir to the at least one accumulator via the at least one inlet during a braking event of the aircraft.

The braking event may be in-flight, such as when performing a pre-landing test of the brakes, or at the end of a flight, such as during a landing event of the aircraft. Precluding operation of the pump during the braking event may improve a reliability of the aircraft hydraulic braking system while reducing a number of components required for redundancy purposes, as outlined above.

Optionally, the at least one hydraulic accumulator comprises a first hydraulic accumulator and a second hydraulic accumulator. Optionally, the aircraft hydraulic braking system is configured to be operable in a first mode, in which the first accumulator is fluidically coupled to the brake actuator to operate the brake actuator, and a second mode, in which the second accumulator is fluidically coupled to the brake actuator to operate the brake actuator.

The first accumulator may be a primary hydraulic accumulator, and the first mode may be a primary operating mode. The second hydraulic accumulator may be either an alternative or a backup or "emergency" hydraulic accumulator, and the second mode may be either an alternative or backup operating mode. In this way, the second hydraulic accumulator may provide alternative and/or backup braking to the first brake actuator, improving a flexibility and/or reliability of the aircraft hydraulic braking system.

Optionally, the aircraft hydraulic braking system comprises a second brake actuator. Optionally, in the first mode, the second hydraulic accumulator is fluidically coupled to the second brake actuator to operate the second brake actuator. Optionally, in the second mode, the second hydraulic accumulator is fluidically coupled to the second brake actuator to operate the second brake actuator.

In this way, the first and second hydraulic accumulators may be configured in the first mode, such as during "normal" operation, to brake respective first and second brake actuators, which may be brake actuators of the same or different landing gears of the aircraft. In the second mode, the first hydraulic accumulator may be configured to brake one or both of the first and second brake actuators, such as in the event of a failure of the second hydraulic accumulator. The second hydraulic accumulator may be larger than the first hydraulic accumulator, such as to provide sufficient energy to brake both the first and second brake actuators. This may improve a reliability of the system without requiring additional hydraulic accumulators, thereby reducing a weight and complexity of the aircraft.

A second aspect of the present invention provides a method of controlling a hydraulic braking system of an aircraft, the hydraulic braking system comprising a brake actuator and at least one hydraulic accumulator. The at least one hydraulic accumulator is the sole source of pressurised hydraulic fluid in the hydraulic braking system for operating the brake actuator. The method comprises precluding charging of, or not charging, the at least one hydraulic accumulator during a flight of the aircraft, and causing at least partial discharge of the at least one hydraulic accumulator to operate the brake actuator during the flight or during a landing event at an end of the flight.

By not charging the at least one hydraulic accumulator during the flight of the aircraft, a complexity and/or weight of the hydraulic braking system may be reduced, and/or a reliability of the hydraulic braking system may be improved, in any way as described above. Moreover, this may avoid a need to certify a charging system for charging the at least one accumulator during the flight.

In this aspect, the aircraft hydraulic braking system may comprise, or may be free from, plural hydraulic accumulators fluidically connected in series.

Optionally, the method comprises causing charging of the at least one hydraulic accumulator while the aircraft is on the ground before the flight. The at least one hydraulic accumulator may be fully, or only partially, charged, in order to provide at least sufficient power to brake the aircraft during the landing event at the end of the flight.

Optionally, the causing charging comprises causing charging of the at least one hydraulic accumulator from a hydraulic fluid source of the hydraulic braking system. In this way, the charging of the accumulator may be performed without requiring connection to an external source of hydraulic fluid.

Optionally, the hydraulic fluid source comprises a hydraulic fluid reservoir and a pump for pumping hydraulic fluid from the hydraulic fluid reservoir to the at least one accumulator to charge the at least one accumulator. This may provide any of the advantages discussed above in relation to the first aspect.

Optionally, the hydraulic braking system comprises an isolator for isolating the pump from the at least one accumulator during the flight, or during flight of the aircraft. Alternatively, or additionally, the hydraulic braking system is configured so that the pump is precluded from operating during the flight, or during flight of the aircraft. This may provide any of the advantages discussed above in relation to the first aspect.

Optionally, the pump and the reservoir are configured to provide hydraulic fluid exclusively to the hydraulic braking system. This may provide any of the advantages discussed above in relation to the first aspect.

Optionally, the method comprises precluding charging of, or not charging, the at least one hydraulic accumulator during the causing at least partial discharge of the hydraulic accumulator. The method may comprise precluding charging of, or not charging, the at least one hydraulic accumulator during the whole landing event. This may improve a reliability of the aircraft hydraulic braking system, optionally while reducing a number of components required for redundancy purposes, as outlined above.

Optionally, the method comprises precluding in-flight charging of the at least one hydraulic accumulator. That is, the at least one hydraulic accumulator may not be charged during any flight of the aircraft. Alternatively, the accumulators may be charged during one or more flights of the aircraft. In such a case, a charging system for the accumulator, such as a charging system comprising the hydraulic fluid source, may require certification, such as by certifying a pump and/or other component(s) of the hydraulic fluid source.

A third aspect of the present invention provides an aircraft braking system controller configured to perform the method of the second aspect.

The controller may be supplied in isolation. Alternatively, the controller may be a part of the aircraft hydraulic braking system, or any other suitable control system of the aircraft. The controller may provide any of the optional features and/or advantages of the second aspect.

A fourth aspect of the present invention provides an aircraft hydraulic braking system according to the first aspect, comprising the aircraft braking system controller of the third aspect.

A fifth aspect of the present invention provides a non-transitory computer-readable storage medium storing instructions that, when executed by a processor of an aircraft braking system controller, such as the controller of the third aspect, cause the processor to perform the method of the second aspect.

A sixth aspect of the present invention provides a braking system for an aircraft, the braking system comprising a first hydraulic braking system and a second hydraulic braking system. The first hydraulic braking system comprises a first supply of hydraulic fluid and is configured to brake a first wheel of the aircraft, and the second hydraulic braking system comprises a second supply of hydraulic fluid and is configured to brake a second wheel of the aircraft. The braking system is free from any fluidic connection between the first and second hydraulic braking systems.

Optionally, the first and second supplies of hydraulic fluid are exclusive to the respective first and second hydraulic braking systems. Optionally, the first and second supplies of hydraulic fluid are de-centralised, so that they are unable to provide pressurised hydraulic fluid to any other hydraulic fluid system of the aircraft, such as a hydraulic fluid system for operating flight surfaces and/or landing gear extension or retraction.

Optionally, the braking system is free from any fluid connections between the braking system and other hydraulic fluid systems of the aircraft. Omitting any fluid connections between the first and second hydraulic braking systems, and optionally between the braking system and other hydraulic fluid systems of the aircraft, may reduce a weight of the aircraft. Providing local hydraulic fluid sources may reduce a complexity and/or weight of the aircraft braking system, such as by reducing an amount of hydraulic fluid present in fluid connections between components of the aircraft.

Optionally, the first wheel is a wheel of a first landing gear, and the second wheel is a wheel of a second landing gear. That is, the first and second hydraulic braking systems may be local to respective first and second landing gears. This may reduce a number of, or eliminate any, fluid connections between hydraulic braking systems of landing gears on opposite sides of an aircraft, thereby reducing a weight of the aircraft braking system, while reducing complexity and increasing reliability.

Optionally, the first hydraulic braking system and/or the second hydraulic braking system comprises the aircraft hydraulic braking system of the first or fourth aspects. As such, the first and/or second hydraulic braking systems may benefit from any of the advantages provided by the first or fourth aspects, and optional features thereof.

A seventh aspect of the present invention provides an aircraft comprising the aircraft hydraulic braking system of the first or fourth aspect, the aircraft braking system controller of the third aspect, the non-transitory computer-readable storage medium of the fifth aspect, or the braking system of the sixth aspect. The aircraft may benefit from any of the advantages provided by the first, third, fourth, fifth, and sixth aspects, or optional features thereof.

BRIEF DESCRIPTION OF THE DRAWINGS

Embodiments of the invention will now be described, by way of example only, with reference to the accompanying drawings, in which.

DETAILED DESCRIPTION

Figure 1:
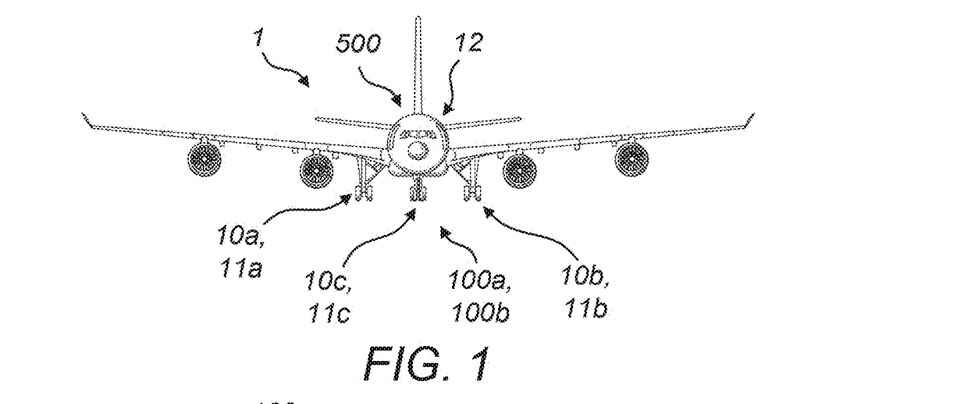
FIG. 1 shows a schematic view of an aircraft according to an example.

The present disclosure describes an aircraft hydraulic braking system for braking at least one wheel of an aircraft, such as the aircraft 1 shown in FIG. 1. The aircraft 1 comprises plural landing gears 10a to 10c, specifically first and second main landing gears 10a, 10b located on opposite sides of a fuselage 12 of the aircraft, and a nose landing gear 10c aligned with the fuselage. Each landing gear comprises respective sets of wheels 11a to 11c. The aircraft 1 comprises a braking system comprising first and second hydraulic braking systems 100a, 100b, each configured to brake a subset of the wheels 11a, 11b of the aircraft 10. In the illustrated example, this is by each hydraulic braking system 100 being configured to brake the wheels 11a, 11b of a respective one of the landing gears 10a, 10b. In other examples, this is by each hydraulic braking system 100 being configured to brake a subset of wheels 11a 11b of one or both of the main landing gears 10a, 10b. In other examples, as described below, the aircraft comprises an aircraft hydraulic braking system 100 configured to brake the wheels 11a, 11b of both the first and second main landing gears 10a, 10b. The wheels 11c of the nose landing gear are unbraked, but could alternatively be braked by one of the aircraft hydraulic braking systems 100a, 100b, or another suitable braking system. In other examples, the aircraft 1 comprises any other suitable number of main landing gears, each comprising any suitable number of wheels, braked or unbraked.

Figure 2:
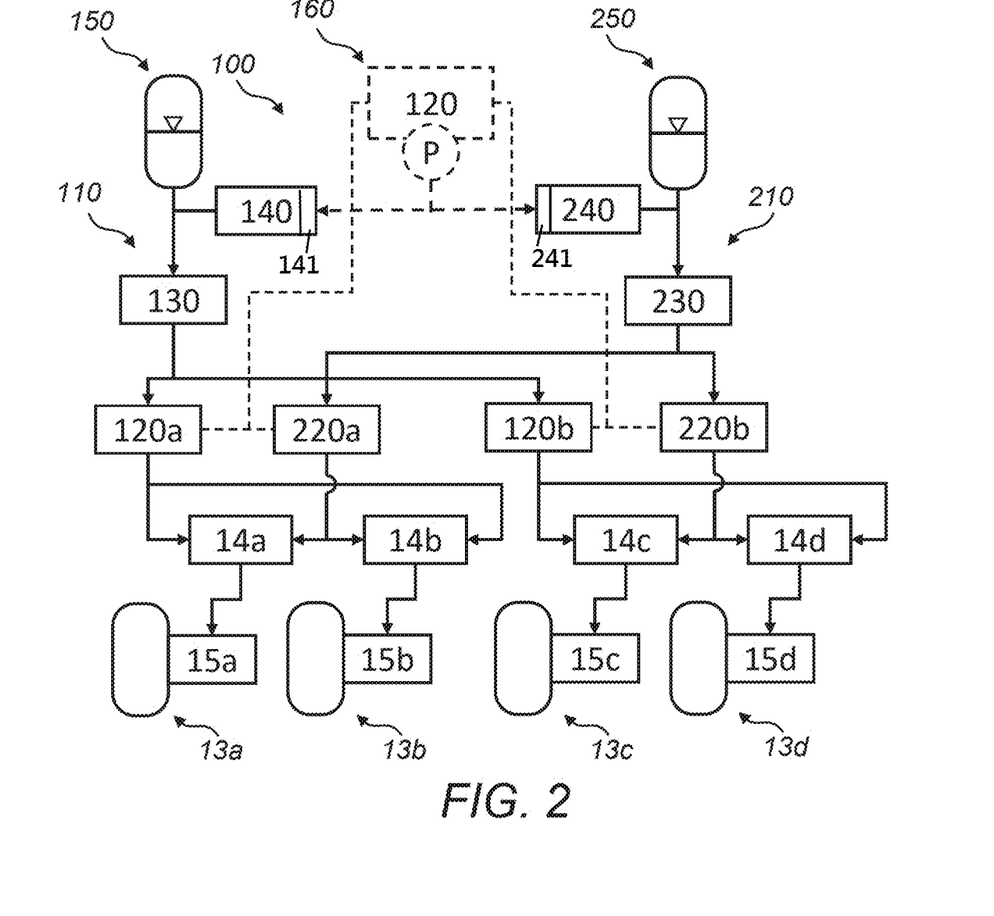
FIG. 2 shows a schematic view of a hydraulic braking system of the aircraft of FIG. 1.

FIG. 2 shows an example of an aircraft hydraulic braking system 100 (or "braking system 100"), which is an exemplary one of the first and second hydraulic braking systems 100a, 100b. The aircraft hydraulic braking system 100 comprises two subsystems, specifically a primary subsystem 110 and a secondary subsystem 210. The primary subsystem 110 comprises a primary hydraulic accumulator 150 (or "accumulator 150"), while the secondary subsystem 210 comprises a secondary hydraulic accumulator 250 (or "accumulator 250"). The primary and secondary subsystems 110, 210 are couplable to first to fourth brakes actuators 15a to 15b for braking respective first to fourth wheels 13a to 13d of the aircraft 1. Each of the first to fourth wheels 13a to 13d are on a single one of the main landing gears. In other examples, the first and second wheels 13a to 13b are wheels 11a of the first main landing gear 10a, while the third and fourth wheels 13c, 13d are wheels 11b of the second main landing gear 10b. The brake actuators 15a to 15d are configured to brake a single respective wheel 13a to 13d of the aircraft 1, but may alternatively be configured to brake any number of wheels 13a to 13d.

Each of the first to fourth brake actuators 15a to 15d is couplable, by a respective one of first to fourth shuttle valves 14a to 14d, to either the primary subsystem 110 or the secondary subsystem 210, specifically to receive pressurised hydraulic fluid from either the primary accumulator 150 or the secondary accumulator 250 to operate the respective brake 15a to 15d. The first to fourth shuttle valves 14a to 14d are each coupled, or couplable, to the primary and secondary subsystems 110, 210 so that hydraulic fluid is passed through the shuttle valve from the subsystem 110, 210 providing the highest pressure hydraulic fluid to the respective shuttle valve 14a, 14d. In other words, each shuttle valve 14a to 14d is passively operable by providing pressurised hydraulic fluid from one of the subsystems 110, 210 of the hydraulic braking system 100 to one opening of the shuttle valve 14a to 14d, and providing pressurised hydraulic fluid at a lower pressure, or providing no hydraulic fluid, from the other subsystem 110, 210 of the braking system 100 to another opening of the shuttle valve 14a to 14d. In other examples, the shuttle valves 14a to 14d may be replaced by any other suitable valves, such as electromechanical valves, for passing hydraulic fluid to the brake actuators 15a to 15b from either the primary subsystem 110 or the secondary subsystem 210.

The braking system 100 comprises first and second primary servo valves 120a, 120b and first and second secondary servo valves 220a, 220b, which may herein be referred to as primary and secondary "pairs" of servo valves 120a, 120b and 220a, 220b. The primary and secondary pairs of servo valves 120a, 120b and 220a, 220b are located in the respective first and second subsystems 110, 210 of the braking system, and are fluidically couplable to the respective primary and secondary hydraulic accumulators 150, 250 by respective primary and secondary selector valves 130, 230.

A first side of each of the first and second shuttle valves 14a, 14b is coupled, or couplable, to the first primary servo valve 120a, and a second, opposing, side of each of the first and second shuttle valves 14a, 14b is coupled, or couplable, to the first secondary shuttle valve 220a, so that hydraulic fluid is passable from the respective primary and secondary subsystems 110, 210 to the respective first and second sides of the first and second shuttle valves 14a, 14b. Similarly, a first side of each of the third and fourth shuttle valves 14c, 14d is coupled, or couplable, to the second primary servo valve 120b, and a second, opposing, side of each of the third and fourth shuttle valves 14c, 14d is coupled, or couplable, to the second secondary shuttle valve 220b, so that hydraulic fluid is passable from the respective primary and secondary subsystems 110, 210 to the respective first and second sides of the third and fourth shuttle valves 14c, 14d. The primary and secondary pairs of servo valves are individually operable, such as by a controller as described below, to control an amount of pressurised hydraulic fluid that is passed from the respective primary and secondary subsystems 110, 210 to the first to fourth shuttle valves 14a to 14d, and thereby to the brake actuators 15a to 15d, to brake the wheels 13a to 13d. In some examples, the first and second primary and secondary servo valves 120a, 220a are operable to control braking of wheels 13a to 13d of a single one of the main landing gears 10a, 10b. In other examples, the first primary and secondary servo valves 120a, 220a are operable to control braking of wheels 13a, 13b of the first main landing gear 10a, while the second primary and secondary servo valves 120b, 220b are operable to control braking of wheels 13c, 13d of the second main landing gear 10b. Alternatively, there may be any other number of servo valves 120a, 120b and 220a, 220b operable to cause braking of any other number of wheels 13a to 13d.

The primary and secondary selector valves 130, 230 are operable, such as by a controller as described below, to selectively permit pressurised hydraulic fluid to pass from the respective primary and secondary accumulators 150, 250 to the respective primary and secondary pairs of servo valves 120a, 120b and 220a, 220b. In other words, the primary and secondary selector valves 130, 230 are operable to isolate the respective primary and/or secondary accumulators from the brake actuators 15a to 15d. This may provide improved redundancy, such in the event of a failure of any one of the primary and secondary selector valves 120a, 120b and 220a, 220b.

In the present example, the secondary subsystem 210 is a "backup", or "emergency" subsystem, such as to provide redundancy braking in the event of a failure in the primary subsystem 110. That is, the braking system 100 is operable in a primary mode, in which the primary accumulator 150 is fluidically coupled to each of the brake 15a to 15d to operate the brake actuators 15a to 15d, and a secondary mode, in which the secondary accumulator 250 is fluidically coupled to each of the brake actuators 15a to 15d to operate the brake actuators 15a to 15d. That is, the secondary mode in the present example is a backup mode. As such, the secondary accumulator 250 is smaller than the primary accumulator 150, but in other examples the primary and secondary hydraulic accumulators 150, 250 may be the same size as each other, or the secondary hydraulic accumulator 250 may be larger than the primary hydraulic accumulator 150.

In another example, in a first mode, the first subsystem 110 is coupled to provide pressurised hydraulic fluid to operate one or more of the brake actuators 15a to 15d, such as the first and second brake actuators 15a, 15b, while the second subsystem is coupled to provide pressurised hydraulic fluid to one or more other brake actuators 15a to 15d, such as the third and fourth brake actuators 15c, 15d. The braking system 100 may be operated in the second mode for instance in the event of a failure of the secondary hydraulic accumulator 250. In such an example, the primary accumulator 150 may be larger than the secondary accumulator 250, and indeed may be "oversized", so that it is able to provide sufficient pressurised hydraulic fluid to operate each of the first to fourth brake actuators 15a to 15d.

In any event, in the example shown in FIG. 2, the primary and secondary hydraulic accumulators 150, 250 are the sole sources of hydraulic fluid in the hydraulic braking system 100 for operating the brake actuators 15a to 15d. That is, pressurised hydraulic fluid for operating the brake actuators 15a to 15d can only be received from one or both of the first and second hydraulic accumulators 150, 250, regardless of any operating state. For example, in a primary operating mode, the pressurised hydraulic fluid is receivable from the primary hydraulic accumulator 150, while in a secondary operating mode, and/or a backup mode, the pressurised hydraulic fluid is receivable from the secondary hydraulic accumulator 250. There are no other sources of pressurised hydraulic fluid for operating the brake actuators 15a to 15d. In some examples, there is only one accumulator 150, 250, being the sole source of pressurised hydraulic fluid for operating the brake actuators 15a to 15d, while in other examples there are more than two accumulators 150, 250, together being the sole sources of pressurised hydraulic fluid for operating the brake actuators 15a to 15d. Moreover, the hydraulic braking system 100 of the present example is free from plural hydraulic accumulators fluidically connected in series.

The illustrated hydraulic braking system 100 comprises a primary inlet 140 for receiving hydraulic fluid to charge the primary hydraulic accumulator 150, and a secondary inlet 240 for receiving hydraulic fluid to charge the secondary hydraulic accumulator 250. The aircraft hydraulic braking system 100 is, however, configured so that in-flight charging of the primary and secondary accumulators 150, 250 through the respective primary and secondary inlets 140, 240 is precluded.

As shown using dashed lines in FIG. 2, the aircraft hydraulic braking system 100 of the illustrated example comprises a hydraulic fluid source 160 for charging the first and second hydraulic accumulators 150, 250 via the respective first and second inlets. The hydraulic fluid source 160 comprises a hydraulic fluid reservoir 120 and a pump P for pumping hydraulic fluid from the hydraulic fluid reservoir 120 to the primary and secondary hydraulic accumulators 150, 250 via the primary and secondary inlets 140, 240.

In some examples, the hydraulic fluid reservoir 120 is configured to receive hydraulic fluid from the brake actuators 15a to 15b following a braking event. Specifically, as shown with dashed lines in FIG. 2, in some examples, the hydraulic braking system 100 comprises return fluid lines from the first and second primary and secondary servo valves 120a, 120b and 220a, 220b, to the hydraulic reservoir 120. In some such examples, the brake actuators 15a to 15b comprise return biasing members, such as return springs, to cause the brake actuators 15a to 15b to return to an unbraked position following a braking event when pressurised fluid is no longer being supplied to operate the brake actuators 15a to 15d. This may be by the first and second primary and secondary servo valves 120a, 120b and 220a, 220b being operable to isolate the brake actuators 15a to 15d from the first and second hydraulic fluid sources 150, 250 and couple the brake actuators 15a to 15d to the hydraulic fluid reservoir 120 via respective return lines.

It will be appreciated that the pump P and reservoir 120 are not sources of pressurised hydraulic fluid for operating the brake actuators 15a to 15d. They are instead sources of hydraulic fluid for charging the accumulators 150, 250, and are precluded from in-flight operation, and/or are isolated from the accumulators 150, 250 and the brake actuators 15a to 15d, during any flight of the aircraft 10, including during braking events of the aircraft 10, which may be performed as pre-landing tests, or during landing events at the ends of flights of the aircraft 10. That is, as noted above, the primary and secondary hydraulic accumulators are the sole sources of pressurised hydraulic fluid for operating the brake actuators 15a to 15d, regardless of the presence of the hydraulic fluid source 160.

In some examples, the primary and secondary inlets 140, 240 comprise, and/or are defined by, respective primary and secondary isolators 141, 241. In some examples, the primary and secondary isolators are configured, and/or are operable, to isolate the pump P from the primary and secondary accumulators 150, 250 during flight of the aircraft 10, in order to preclude in-flight charging of the primary and secondary hydraulic accumulators 150, 250.

In other examples, in-flight charging of the primary and secondary accumulators 150, 250 is precluded instead by the aircraft hydraulic braking system being free from any hydraulic fluid source 160 for charging the first and second accumulators 150, 250 via the respective first and second inlets 140, 240. That is, in some examples, the pump P and reservoir 120 are not present, and the accumulators 150, 250 can only be charged using fluid supplied from an external hydraulic fluid source, such as a ground-based hydraulic fluid source, when the aircraft is on the ground.

Figure 3:
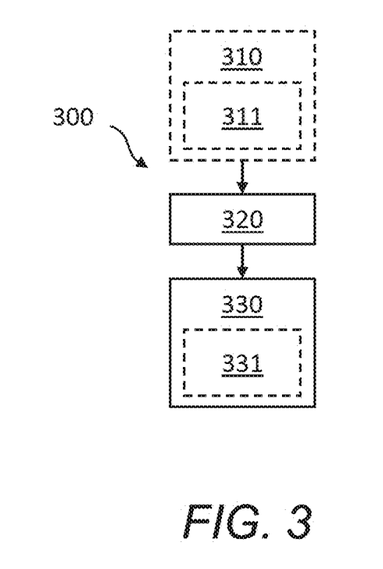
FIG. 3 shows an example method of controlling the hydraulic braking system of FIG. 2.

Turning now to FIG. 3, shown is an example method 300 of controlling the hydraulic braking system 100. The method comprises precluding 320 charging of, or not charging, the primary and secondary hydraulic accumulators 150, 250 during a flight of the aircraft 10. The method further comprises causing 330 at least partial discharge of the primary and/or secondary hydraulic accumulator 150, 250 to operate one or more of the brake actuators 15a to 15d during a landing event at an end of the flight, and/or during the flight such as during an in-flight pre-landing test of the hydraulic braking system 100.

In some examples, the method also comprises causing 310 charging of the primary and/or secondary hydraulic accumulator 150, 250 while the aircraft 10 is on the ground before the flight. This may comprise fully or only partially charging the primary and/or secondary hydraulic accumulator 150, 250, as suited to the needs of the flight.

In some examples, the causing 310 charging of the primary and/or secondary hydraulic accumulator 150, 250 comprises causing 311 charging of the respective primary and/or secondary hydraulic accumulator 150, 250 from the hydraulic fluid source 160, such as by operating the pump P of the hydraulic braking system 100 while the aircraft is on the ground. In other examples, the causing 310 the charging is performed by ground crew, such as by connecting an external hydraulic fluid supply to the respective primary and secondary inlets 140, 240.

In some examples, the method comprises precluding 331 charging of, or not charging, the primary and secondary hydraulic accumulators 150, 250 during the causing 330 at least partial discharge of either or both of the primary and secondary hydraulic accumulators 150, 250 to operate the brake actuator during the flight or during the landing event at the end of the flight.

In some examples, the precluding 320 the charging of the primary and secondary hydraulic accumulators during the flight, and/or the precluding 331 the charging of the primary and secondary hydraulic accumulators 150, 250 during the causing 330 at least partial discharge of the primary and/or secondary hydraulic accumulator 150, 250, is achieved by precluding in-flight charging of the primary and secondary hydraulic accumulators 150, 250. That is, in some examples, as described above, the primary and secondary hydraulic accumulators 150, 250 are precluded from charging during any flight of the aircraft 10.

In the illustrated example, the aircraft 10 comprises an aircraft braking system controller 500 (or "controller 500"). The controller 500, and/or a processor (not shown) thereof, is configured to perform the method 300 of controlling the hydraulic braking system 100. In the present example, the controller 500 is a part of the hydraulic braking system 100, but in other examples, the controller 500 may be remote from the hydraulic braking system 100 and communicatively coupled to the hydraulic braking system 100. In some such examples, the controller 500 may be a part of a braking system (not shown) of the aircraft 10, the braking system comprising plural hydraulic braking systems 100, and the controller 500 may be communicatively coupled to each of the plural hydraulic braking systems 100. In other examples, the controller 500 is any other suitable controller of the aircraft 10, or is a remote from the aircraft, such as in a cloud-based computing network to which the hydraulic braking system 100 is coupled, and/or is a part of a ground station, such as a ground station of a runway.

In any event, the controller 500 is configured to operate any one or more of the components of the hydraulic braking system 100 to achieve the functionality described above with reference to the method 300 of FIG. 3 and/or the hydraulic braking control system 100 of FIG. 2. For example, the controller 500 may be configured to operate any one or more of: the pump P; first and/or second isolators coupled to, or comprising, the respective primary or secondary inlets 140, 240; the primary and/or secondary selector valves 130, 230; the primary and/or secondary pairs of servo valves 120a, 120b and 220a, 220b; and the first to fourth shuttle valves 14a to 14d, to provide the desired functionality, as will be understood.

Figure 4:
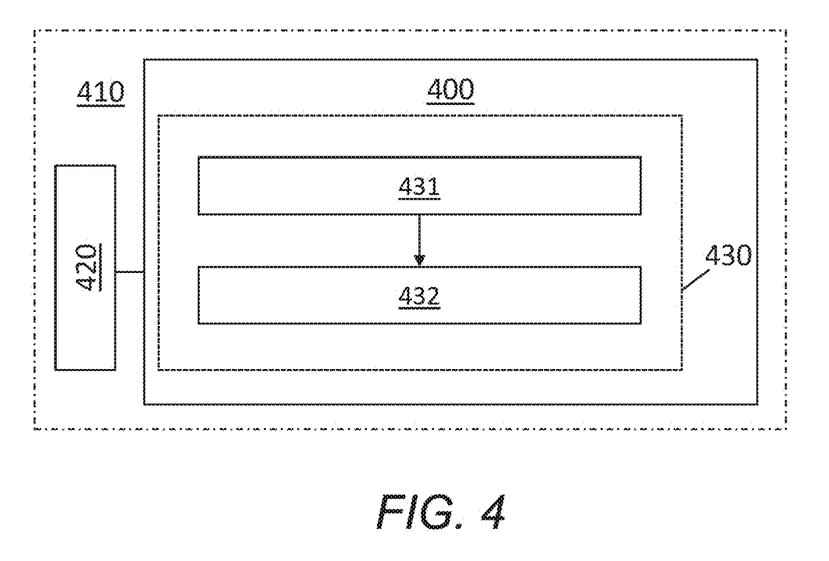
FIG. 4 shows a schematic view of a non-transitory computer-readable storage medium according to an example.

FIG. 4 shows a schematic diagram of a non-transitory computer-readable storage medium 400 according to an example. The non-transitory computer-readable storage medium 400 stores instructions 430 that, if executed by a processor 420 of a controller 410 or system 410, cause the processor 420 to perform a method according to an example. In some examples, the controller 410 or system 410 is the aircraft braking system controller 500, and/or the hydraulic braking system 100. In some examples, the processor 420 is the processor as described above with reference to the controller 500, or any variation thereof discussed herein.

The instructions 420 comprise precluding 431 charging of, or not charging, the primary and secondary hydraulic accumulators 150, 250 during a flight of the aircraft 10, and causing 432 at least partial discharge of the primary and/or secondary hydraulic accumulator 150, 250 to operate one or more of the brake actuators 15a to 15d during the flight or during a landing event at an end of the flight. In some examples, the computer readable storage medium 400 stores instructions that, if executed by the processor 420, cause the processor 420 to perform the method 300 described above with reference to FIG. 3 or any variant thereof discussed herein.

It will be understood that while the above description is illustrative of an example hydraulic system 100, other arrangements may be possible without departing from the scope of the invention, which is defined by the appended claims. For instance, it will be appreciated that the arrangement of valves shown in FIG. 2 is exemplary only, and that the hydraulic accumulators 150, 250 may be coupled, or couplable, to the brake actuators 15a to 15d using any other suitable combination of valves known to the skilled person. Similarly, there may be any number of such hydraulic accumulators 150, 250 coupled to any number of brake actuators 15a to 15d for braking any number of wheels 13a to 13d of any number of landing gears 10a to 10c.

Additionally, as noted briefly above, the aircraft 10 comprises a braking system comprising first and second hydraulic braking systems 100a, 100b, each configured to brake a subset of the wheels 11a, 11b of the main landing gears 10a, 10b. In some such examples, this is by each hydraulic braking system 100 being configured to brake the wheels 11a, 11b of a respective one of the landing gears 10a, 10b. In such cases, the hydraulic braking systems 100a, 100b are self-contained. That is, they each comprise their own, local, hydraulic accumulators 150, 250. In some examples, the primary and secondary hydraulic accumulators 150, 250 are exclusive to the respective hydraulic braking systems 100. It will be understood that, for this to be the case, the braking system is free from any fluidic connections between any of the plural hydraulic braking systems 100. Alternatively, however, as noted above, the aircraft 1 may comprise only a single one of the hydraulic braking systems 100a, 100b. In some such examples, the hydraulic braking system 100 is configured to brake wheels 11a, 11b on both the first and the second main landing gears 10a, 10b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft hydraulic braking system configured to be onboard an aircraft, the aircraft hydraulic braking system comprising:
at least one hydraulic accumulator and a brake actuator, wherein the at least one hydraulic accumulator is the sole source of pressurized hydraulic fluid in the aircraft hydraulic braking system for operating the brake actuator;
at least one inlet configured to receive pressurized hydraulic fluid from a hydraulic fluid source,
wherein the aircraft hydraulic braking system is configured with a first mode of operation in which the at least one hydraulic accumulator is isolated from the hydraulic fluid source,
wherein the aircraft hydraulic braking system is configured to operate in the first mode while the aircraft is in flight to prevent hydraulic fluid from flowing via the at least one inlet from the hydraulic fluid source to the at least one hydraulic accumulator,
wherein the aircraft hydraulic braking system is configured with a second mode of operation in which the at least one hydraulic accumulator is in fluid communication with the pressurized fluid source via the at least one inlet, and
wherein the aircraft hydraulic braking system is configured to operate in the second mode during a period while the aircraft is on the ground.

2. The aircraft hydraulic braking system of claim 1, wherein the aircraft braking system is in the first mode during a braking event of the aircraft.

3. The aircraft hydraulic braking system of claim 1, wherein the at least one accumulator comprises a first accumulator and a second accumulator; and
   wherein the aircraft hydraulic braking system is configured to be operable in a third mode, in which the first accumulator is fluidically coupled to the brake actuator to operate the brake actuator, and a fourth mode, in which the second accumulator is fluidically coupled to the brake actuator to operate the brake actuator.

4. The aircraft hydraulic braking system of claim 3, further comprising a second brake actuator, wherein, in the third mode, the second accumulator is fluidically coupled to the second brake actuator to operate the second brake actuator.

5. The aircraft hydraulic braking system of claim 3, further comprising a second brake actuator, wherein, in the fourth mode, the second accumulator is fluidically coupled to the second brake actuator to operate the second brake actuator.

6. The aircraft hydraulic braking system of claim 1, further comprising a controller configured to:
   preclude charging of the at least one hydraulic accumulator during the flight of the aircraft; and
   cause at least partial discharge of the at least one hydraulic accumulator to operate the at least one brake actuator during the flight or during a landing event at an end of the flight.

7. The aircraft hydraulic braking system of claim 6, wherein the controller is further configured to cause charging of the at least one hydraulic accumulator while the aircraft is on the ground before the flight.

8. The aircraft hydraulic braking system of claim 7, wherein the charging of the at least one hydraulic accumulator is from the hydraulic fluid source.

9. The aircraft hydraulic braking system of claim 6, wherein the preclusion of the charging of the at least one hydraulic accumulator is performed during the causing the at least partial discharge of the hydraulic accumulator.

10. An aircraft comprising the aircraft hydraulic braking system of claim 1.

11. The aircraft hydraulic braking system of claim 1, wherein the hydraulic fluid source comprises a hydraulic fluid reservoir, and
    the hydraulic braking system further comprises a pump configured to pump hydraulic fluid from the hydraulic fluid reservoir to the at least one accumulator via the at least one inlet to charge the at least one accumulator while the aircraft hydraulic braking system is in the second mode of operation.

12. A braking system configured to be mounted onboard an aircraft, the braking system comprising:
    a first hydraulic braking system including first accumulator of hydraulic fluid and a first brake actuator, wherein the first hydraulic braking system is configured to brake a first wheel of the aircraft and the first accumulator is the sole source of pressurized hydraulic fluid for operating the first brake actuator, and
    a second hydraulic braking system includes a second accumulator of hydraulic fluid and a second brake actuator, wherein the second hydraulic braking system is configured to brake a second wheel of the aircraft and the second accumulator is the sole source of pressurized hydraulic fluid for operating the second brake actuator;
    wherein the first hydraulic braking system is isolated from and devoid of fluidic connection with the second hydraulic braking system.

* * * * *